United States Patent [19]

Finck

[11] 4,037,362
[45] July 26, 1977

[54] DEVICE FOR SOILLESS GROWTH OF PLANTS

[76] Inventor: Darrel S. Finck, 4180 E. Avenue, Hayward, Calif. 94544

[21] Appl. No.: 718,347

[22] Filed: Aug. 27, 1976

[51] Int. Cl.² .................... A01G 31/00; A01G 25/00
[52] U.S. Cl. ........................................ 47/59; 47/79; 47/62
[58] Field of Search .................. 47/59, 60, 62, 63, 79, 47/1.4

[56] References Cited

U.S. PATENT DOCUMENTS

| | | | |
|---|---|---|---|
| 2,639,549 | 5/1953 | Wubben et al. | 47/62 |
| 2,674,828 | 4/1954 | Tegner | 47/62 |
| 3,451,162 | 6/1969 | Rasmussen | 47/62 |
| 3,543,437 | 12/1970 | Gaines, Jr. | 47/59 |
| 3,992,809 | 11/1976 | Chew | 47/62 |

FOREIGN PATENT DOCUMENTS 2,243,762  3/1974  Germany .................. 47/59

Primary Examiner—E. H. Eickholt
Attorney, Agent, or Firm—Warren, Chickering & Grunewald

[57] ABSTRACT

There is disclosed a device for holding and growing plant material by hydroponic techniques, the device including a tray having sloping sidewalls, with the sidewalls having extensions for being supported on a rail, and a corrugated bottom with the corrugations shaped to provide drainage of liquid from the bottom of the tray and to hold a water-impervious, seed-holding membrane above the corrugations so that the membrane will have a crown that causes liquid to drain toward the edges of the tray.

4 Claims, 2 Drawing Figures

DEVICE FOR SOILLESS GROWTH OF PLANTS

BACKGROUND OF THE INVENTION

Hydroponics is the soilless growing of plants. Hydroponics is an especially useful technique for producing food for livestock. The advantages of the use of hydroponics to produce livestock feed are that fresh feed is available all year, the feed that is available is free from undesirable materials such as weeds, wild garlic and onion plants, insects, dust, insecticides, radioactive fallout, to name a few. The product is also free of soil so that animals can eat the entire plant, root and all.

Properly designed hydroponic devices can yield an enormous output of plant material in a short time. The yield is large and quick because of the opportunity to control germination, temperature, light, and fertilizer for the growth of plants. It is not unusual to produce a 9-inch growth of grass from barley seed in seven days and the growth of grass produces a seven-fold increase in weight over the seeds that were employed. The hydroponically grown grass also contains vitamins, minerals, and other nutritional requirements that are not present in the seeds.

Hydroponic devices generally are less expensive per unit of yield than growing material in an open field. They are less expensive from the capital investment point of view because it is not necessary to own large amounts of land to grow things hydroponically. They are also less expensive from an operational point of view because high yields can be obtained without the labor and equipment necessary to till, fertilize, and harvest plants from fields. However, hydroponic growth of plant materials is not without its problems.

Among the problems involved with hydroponic growth of plant materials are that the ideal growing conditions within a hydroponic device is very attractive to undesirable plant species such as fungus, the different stages the plant material goes through in passing from seed to maturity requires different conditions that cannot always be achieved within the same device, and the uniform exposure of all the material to light, moisture, temperature, and other conditions is difficult to maintain throughout the entire growing cycle.

THE INVENTION

This invention is a device for growing grass from seed hydroponically which eliminates or mitigates the above noted problems. The device of this invention is a container into which seeds may be placed, germinated, and grown to maturity under conditions which provide uniform and adequate exposure to water and nutrients without producing conditions which promote the growth of fungus or permit deterioration of the growing vegetable material.

The device of this invention includes a tray having upstanding sidewalls and a corrugated bottom. The upstanding sidewalls include two opposing sidewalls which have rail-engaging members so that the tray may be suspended from rails within a device equipped to control the moisture, light, temperature, and other parameters necessary for hydroponic growing of plant materials. The other two opposing sidewalls preferably are of a shape or provided with reinforcement to maintain them stiff enough to support the load within the tray without significant bending and without buckling. The sidewalls are sloping so that the distance from sidwall to sidewall increases at points higher above the floor of the tray. Two opposing sidewalls also are provided with protrusions slightly above the top of the corrugations for holding a membrane in place which is to be described hereinafter.

The bottom of the tray is provided with corrugations having upper crests and lower crests. The lower crests of the corrugations are shaped and pitched to provide drainage toward at least one of the sidewalls. The tops of the upper crests also are shaped so that a plane passing through the upper portion of each of the upper crests will have a shape pitched toward one or more of the sidewalls.

The device of this invention also includes a membrane that is made of a non-porous, water-impervious material such as a stiff but bendable plastic sheet. The membrane is dimensioned to reach from sidewall to sidewall of the tray and shaped to be substantially in contact with all of the sidewalls when the membrane is mounted in contact with the upper crests of the corrugations and held beneath the protrusions in the sidewalls. The space between the membrane and the sidewalls should be a crack that is just wide enough for water to seep through but not wide enough for roots to penetrate significantly through the crack. It has been found that a long narrow crack draws water into it by a capillary-like action whereas circular perforations tend not to drain because surface tension of the liquid causes it to bridge across the opening and prevents flow through the perforation.

In a preferred embodiment, the corrugations drain toward a common gutter in the bottom of the tray that is immediately adjacent to and beneath the side wall adapted to ride on a rail. In the preferred embodiment the lower portion of the sidewall may be one wall of the gutter. The gutter is provided with passageways to discharge liquid from the bottom thereof so that the overall effect of this configuration of the tray is to collect the water that passes through the crack between the sidewall and the membrane in a common gutter and to discharge that water from the tray through passageways in the bottom of that gutter. The position of the gutter adapts the device of this invention to discharging liquid into a suitable collecting means located beneath the tray so that the water passing from one tray embodying this invention can be collected and removed from the hydroponic device before it falls upon a tray positioned beneath it in the hydroponic device. This is an important consideration because in most devices for growing plant material hydroponically a number of trays of growing material are held in vertical alignment within the device so that liquid passing from an upper tray will fall upon the growing material in lower trays. U.S. patent application Ser. No. 591,113 filed June 27, 1975 and entitled Hydroponic Device and Method describes one such device wherein trays made in accordance with this invention would be useful.

The upper crests of the corrugations may be shaped to produce drainage in one direction only so that liquid falling upon the growing material will flow toward one sidewall of the tray. In a preferred embodiment, the upper crests of the corrugations are shaped so that the membrane is crowned and that liquid will flow from the center of the membrane toward two opposite sidewalls. This arrangement reduces the time required for liquid to drain from the tray and provides for more even exposure of plant material to liquid during the growing period.

DETAILED DESCRIPTION OF THE INVENTION

This invention can be best described with reference to the accompanying drawings illustrating specific embodiments thereof.

Figure 2:
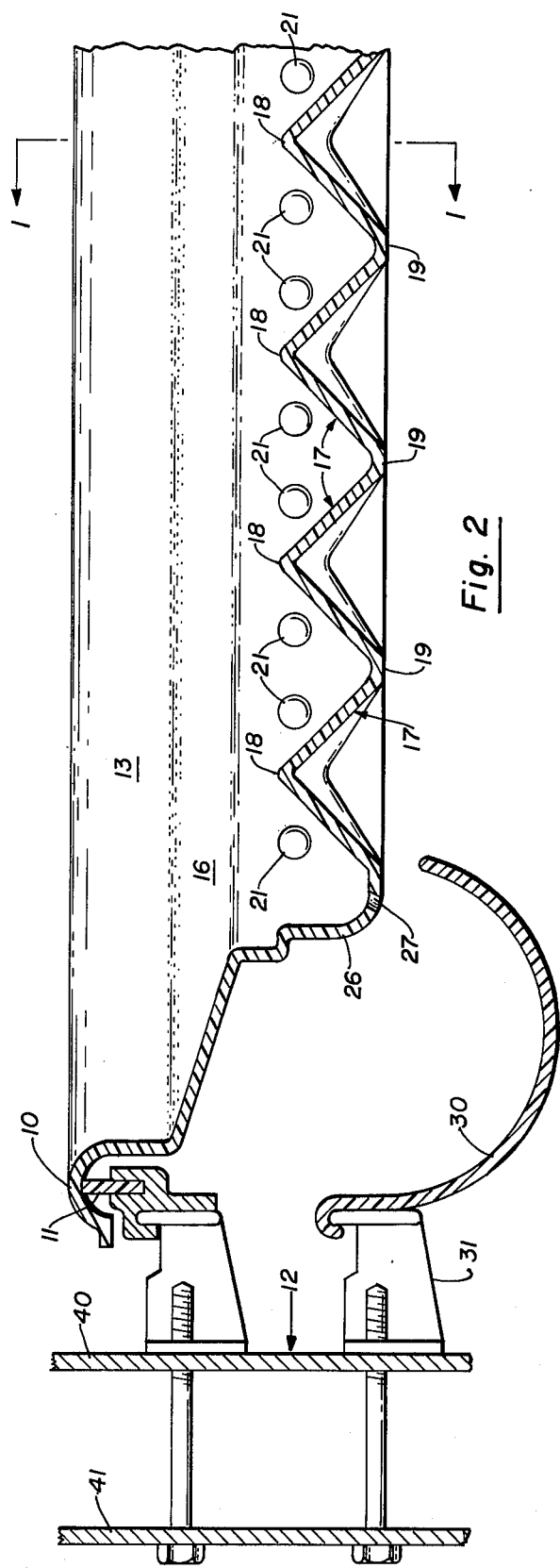
Figure 1:
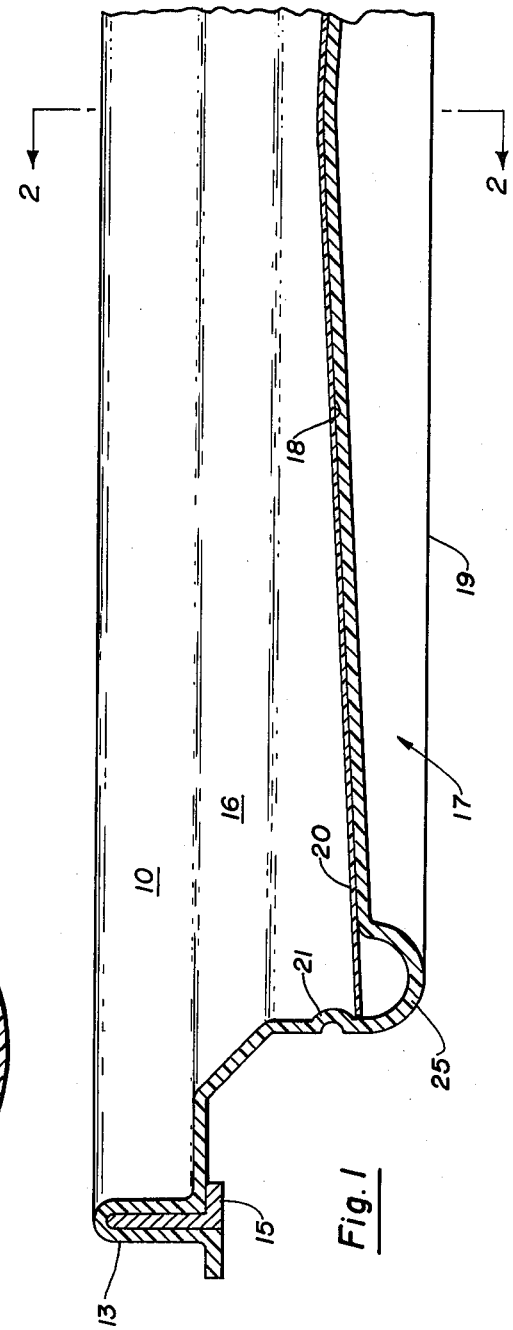

FIG. 1 is a partial sectional view taken along the line 1—1 of FIG. 2 illustrating a device embodying this invention.

FIG. 2 is a partial sectional view taken along the line 2—2 of FIG. 1 of the device illustrated in FIG. 1 and additionally showing a partial sectional view of the hydroponic device and illustrating means for supporting the device of this invention and for collecting the liquid discharging from it. The device illustrated in the figures is in the form of a tray having a rim, sidewalls, and a corrugated bottom. The rim includes opposed sides 10 which are adapted to engage a rail 11 connected to the sidewall 12 of a cabinet adapted for hydroponic processing. The other opposing sidewalls include an upper stiffening element 13 which may include an embedded metal L-shaped element 15 to provide stiffness so that the tray structure will not buckle in supporting the load between the opposing rails 11.

The sidewalls include a sloping portion 16 which provides the function of leaving room for lateral expansion of the growing material as it becomes more voluminous. The device of this invention is normally employed by filling the tray with seeds, placing the tray filled with seeds within a hydroponic cabinet where it is exposed to moisture, light, and a regulated temperature and in the course of its progress through the hydroponic cabinet the seeds germinate and grow to grasses that may achieve a height of 9 inches or more. In growing, the roots become thicker and thicker and there is a tendency for the center of the mat of growing grasses to bridge so that the roots in the center of the mat are raised above the floor and receive less moisture than other portions of the mat. The sloping sidewall 16 provides means for the mat to move laterally, thereby avoiding bridging in the middle. It has been found that the roots of the portion of the mat growing up the sloped sidewall 16 grow rapidly enough to maintain contact with the watered area so that even the edge portion of the growing mat receives adequate moisture to grow uniformly and at the same rate as other portions of the growing mat.

The bottom portion of the tray includes corrugations generally designated 17 which include upper crests 18 and lower crests 19. When the tray is in a horizontal position, the upper crest 18 of the corrugations slope upwardly toward the center of the tray and downwardly toward its edge. The lower crests 19 may also slope upwardly toward the center of the tray or they may be horizontal. A membrane 20 in the form of a stiff but bendable flat plastic sheet is maintained in contact with the upper crests 18 and is dimensioned to be in contact or substantially in contact with the sidewalls of the tray as illustrated in FIG. 1. Protrusions 21 are embossed into the sidewall so that the bottom of the protrusion is slightly above the lowest portion of the upper crest 18. Through this arrangement the membrane 20 is held beneath the protrusions so that it is maintained in contact with the upper crest 18 of the corrugations whereby it takes on a crowned shape draining from the center of the tray toward the sidewall. It has been found that the crack between the sidewall and the membrane 20 through a capillary-like action causes the water to quickly drain from the upper surface of the membrane 20 to the portion of the tray beneath the membrane 20. It has also been found that the narrow crack between membrane 20 and the sidewall is not readily plugged by roots both because of its elongated shape and because of its narrow dimension and as a result adequate drainage from above membrane 20 is maintained even when a dense mat of material has grown on membrane 20.

A hydroponic growing process employing devices of this invention will normally be effected in a narrow cabinet provided with means for watering the growing material and at least the portion where photosynthesis is effected rather than germination, with a means for providing adequate amounts of the proper type of light to promote plant growth. Such cabinets normally hold trays of this device suspended between siderails and in vertical alignment sometimes seven or eight trays in depth with enough space between trays to apply moisture and to admit light to the growing plant material. In known hydroponic processes water applied to each tray drains through the plant material and is removed from the bottom of the tray through perforations or slots. The roots of growing material tend to clog these perforations or slots so that drainage is inadequate and as a result rotting of the roots is encountered. Additionally, water draining from upper trays falls onto the plant material in lower trays so that each tier of trays receives a different amount of moisture than each other tier of trays. In addition, each tier of trays has the moisture is receives applied differently so that growing conditions in each tier are different. Specifically the upper tiers of trays receive less moisture that the lower tiers because all of the moisture draining from the upper tiers drains into the lower tiers. In addition, the lower tiers receive moisture over a longer period of time in that moisture applied quickly to plant material takes a long time to drain from that plant material and as a result the upper tiers of growing material receive moisture in intermittent bursts with complete drainage in between while lower tiers of growing material receive moisture that is applied slowly over long periods or perhaps even continuously.

The device of this invention is well adapted to provide moisture to trays in any position in a hydroponic device in the same amount and at the same rate as moistures applied to any other tray in the hydroponic device. In a preferred embodiment, the moisture applied to growing material in the device of this invention will provide adequate moisture to the growing material but will eventually drain from the upper surface of membrane 20, through the crack between membrane 20 and the sidewall, and into the corrugations or gutters maintained beneath membrane 20. The moisture may be collected in the corrugations and it will drain to a common gutter 25 which in turn will drain into a general collecting gutter 26 which in turn is provided with passageways 27 through which moisture may be removed. In a preferred embodiment of the invention the corrugations 17 run parallel with the opposed rims 10 so that the crown in membrane 20 runs from front to back in the direction that the trays slide along the rails 11. The common gutter 25 has a long axis perpendicular to the long axis of the corrugations and it collects moisture and passes it to the collecting gutter 26 which in turn runs parallel to the long axis of the rail 11. A removing duct 30 may be connected to the sidewall 12 of the hydroponic device by any suitable means such as is illustrated at 31 and this duct is positioned to collect liquid as it discharges from the passageways 27 and to transmit that liquid to a drain which returns it to a sump from which a pump recirculates the liquid onto the growing material in the hydroponic device. Through this means, the water sprayed on the growing material on a tray passes through the growing material, across the upper surface of membrane 20, between membrane 20 and the sidewall, and eventually is collected in collecting gutter 26 and discharged through holes 27 from which it is again collected and returned to the sump. Each tray in the hydroponic device, whether in the highest tier or the lowest tier, will receive only the amount of water applied through the spray and will be able to discharge that water through the same route and in the same time period as trays in any other tier of the hydroponic device. Accordingly, employing the preferred embodiment of this invention the amount of moisture and plant nutrients supplied to the growing material can be accurately measured and uniformly applied to the growing material regardless of its position in the hydroponic device.

Although FIGS. 1 and 2 show enbodiments of this invention only partially, the trays are symetrical about their center line in both views and can be any suitable length or width. Normally a tray is about a maximum of 48 inches square and the corrugations are usually not more that 4 inches from upper crest to upper crest. The trays are preferably made of smooth, shiny plastic materials so that they are easy to clean and do not provide breeding places for fungus or other undesirable growth. The sidewalls 12 are normally formed of an inner plastic sheet 40, an outer metal sheet 41, and insulating material between the inner and outer sheets. The interior hangers and rails are preferably made of smooth plastic or corrosion resistant metals with smooth, easy-to-clean surfaces and with shapes that avoid, as much as possible, sharp corners or crevices.

The device of this invention provides such good control of the exposure of plant material to water that it has been found that fungus growth within the plant material can be controlled without the use of chemicals. It has been found that fungus thrives where there is a pocket of abundant moisture that is continuously present; and the quick, complete drainage of moisture from the device of this invention prevents fungus from starting. It has also been found that cleaning of the device of this invention can be accomplished so easily and completely that no unwanted plant material is carried from one cycle to the next.

What is claimed is:
1. A device useful in soilless growth of plant materials comprising a tray element including:
   a. sidewalls wherein two opposing sidewalls have rail-engaging members, two opposing sidewalls have holding protrusions, and at least two sidewalls slope with respect to vertical to provide upwardly expanding area of said device,
   b. a bottom, including plural corrugations having upper crests and lower crests, wherein the plane including the tops of all upper crests is a surface draining toward said sidewalls and wherein said plane intersects said sidewalls immediately below said holding protrusions, and the bottoms of all corrugations are shaped to drain into a common liquid-collecting passageway, and
   c. a membrane made of water-impervious, non-porous, stiff but bendable material extending across and in contact with the tops of all of said corrugations, substantially in contact with all of said sidewalls and beneath said holding protrusions whereby said membrane forms an upper surface from which liquid will flow from the center of said surface toward the sidewalls.

2. The device of claim 1 wherein the long dimension of said corrugations is parallel with the long dimension of said rail-engaging member.

3. The device of claim 2 wherein said common gutter is shaped to drain toward a collection gutter and said collection gutter has passageways through the bottom thereof to discharge liquid therefrom.

4. The device of claim 3 wherein said collection gutter is parallel to said rail-engaging member and one wall of said collection gutter is common with a sidewall.

* * * * *